United States Patent Office 3,257,191
Patented June 21, 1966

3,257,191
2,5-HALO-3-AMINO-BENZOIC ACIDS AND THEIR USE AS SELECTIVE HERBICIDES
Edward D. Weil, Lewiston, and Edwin Dorfman, Grand Island, N.Y., assignors to Hooker Chemical Corporation, Niagara Falls, N.Y., a corporation of New York
No Drawing. Filed May 15, 1963, Ser. No. 280,714
11 Claims. (Cl. 71—2.5)

This is a continuation-in-part of co-pending application Serial Number 825,640, filed July 8, 1959, now forfeited.

This invention relates to new compositions of matter and to methods of preparing and using these materials. More specifically, this invention resides in new compositions of matter which are designated as halogenated alkylaminobenzoic acids.

The compounds of this invention may be described by the general formula

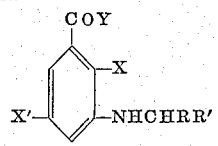

where X and X' are halogens selected from chlorine and bromine, R and R' are hydrogens or a monovalent aliphatic, aryl, or heterocyclic radical, and Y is selected from —OH, —NH$_2$, and —OM where M is a cation.

Compounds included within the scope of this invention are 2,5-dichloro-N-alkylbenzoic acids and salts thereof where the alkyl group is methyl, ethyl, propyl, isopropyl, butyl, amyl, hexyl, and other alkyls of 1–18 carbon atoms. Also included are 2,5-dibromo-N-alkylbenzoic acids and salts thereof, 2-bromo-5-chloro-N-alkylbenzoic acids and salts thereof, and 2-chloro-5-bromo-N-alkylbenzoic acids and salts thereof.

Also included within the scope of the invention are the salts of these acids, and such derivatives as are capable of readily hydrolyzing to yield in the soil or in the plant tissue to the corresponding acid. The water-soluble salts, that is salts which hydrolyze to the acids in the environment of the site of plant growth, are included. Such hydrolyzable derivatives also include the acid halides, anhydrides, lower esters, thiolesters, amides, hydrazides, hydroxamides, thioamides, iminoesters, and thioanhydrides. Also capable of yielding the acid in the soil by oxidation are the aldehyde and alcohol and esters of said alcohol. For economic reasons, the preferred compositions are the free 2,5-dichloro-N-alkylaminobenzoic acid where the alkyl group is an unsubstituted alkyl group of 1–5 carbon atoms or benzyl or furfuryl, and the water soluble salts thereof.

The compositions of the invention may in general be prepared by the reductive alkylation of the corresponding 3-nitro-2,5-dihalo-substituted aromatic compound, using the carbonyl compound corresponding to the alkyl group which is to be introduced. The reducing agent may be various but from the standpoint of economic consideration, hydrogen is the preferred agent and is employed in the presence of a catalytic amount of Raney nickel, palladium, platinum, rhodium or the like hydrogenation catalyst. The nitro group may be reduced first to an unsubstituted amino group, which then reacts with the carbonyl compound to form an imino group —N=CRR' which is subsequently reduced to an alkylamino group —NHCHRR', or these steps may be run concurrently. In either case, the overall reaction is illustrated as follows:

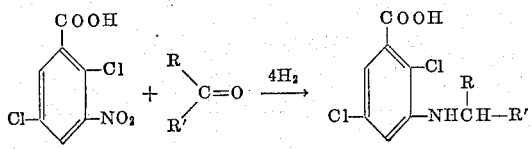

Although the process of this invention is defined in terms of the acid, similar reactions may be conducted with the derivatives of the acid. This process results in a surprisingly high yield under mild reaction conditions. This is quite unexpected since chlorinated aromatic compounds under hydrogenative conditions usually undergo chlorinolysis.

The products of the invention are generally colorless crystalline solids, soluble in both acids and bases, and only slightly soluble in water. Because of their amphoteric nature, they may be conveniently formulated for herbicidal use either as water soluble salts of bases, e.g. caustic, or as water soluble salts of acids, e.g. hydrochloric acid. Suitable carboxylate salts include the sodium, potassium, lithium, ammonium, alkylammonium, dialkylammonium, trialkylammonium and mono-, di-, or trialkanolammonium salts.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monododecylammonium, and similar monoalkylammonium salts of the acids of the invention.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts, of the acids of the invention.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, dimethyllaurylammonium, dimethylstearylammonium and similar salts of the acids of the invention.

Examples of monoalkanolammonium salts are the monoethanolammonium, monopropanolammonium, and similar salts of the acids of the invention.

Examples of dialkanolammonium salts are the diethanolammonium, dipropanolammonium, ethanolpropanolammonium and similar salts of the acids of the invention.

Examples of trialkanolammonium salts are the triethanolammonium, tripropanolammonium, ethanoldipropanolammonium, propanoldiethanolammonium, and similar salts of the acids of the invention.

Examples of monalkyl monoalkanolammonium salts are the methylethanolammonium, ethylethanolammonium, propylethanolammonium, butylethanolammonium, methylpropanolammonium, ethylpropanolammonium, propylpropanolammonium, and butylpropanolammonium, and similar derivatives of the acids of the invention.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of the acids of the invention.

Examples of monoalkyl dialkanolammonium salts are the methyldiethanolammonium, ethyldiethanolammonium, propyldiethanolammonium, butyldiethanolammonium, methyldipropanolammonium, ethyldipropanolamonium, propyldipropanolammonium, butyldipropanolammonium, methylethanolpropanolammonium, ethylethanolpropanolammonium, propylethanolpropanolammonium, butylethanolpropanolammonium, and similar salts of the acids of the invention.

The alklammonium salts preferably have from 1 to 18 carbon atoms in each alkyl group, the totality of carbon atoms preferably being not more than 18. The alkanolammonium salts preferably have from 2 to 3 carbon atoms in each alkanol group. The mixed alkylakanolammonium salts preferably have from 1 to 4 carbon atoms in each alkyl group and from 2 to 3 carbon atoms in each alkanol group.

Examples of dialkylammonium salts in which the radicals are conjoined to form a ring, are piperidinium, pyrolidinium and morpholinium salts. Examples of trialkylammonium salts in which the radicals are conjoined to form a ring are N-methylmorpholinium salts. Examples of alkylammonium salts in which the alkyl groups are cycloaliphatic, include cyclohexylammonium and dicyclohexylammonium salts of the acids of the invention.

Examples of hydrocarbylammonium salts in which the hydrocarbyl radical is aromatic include the anilinium, the N-methylanilinium, the N,N-dimethylanilinium, the naphthylammonium, and the benzylammonium salts of the acids of the invention.

Also the lower alkyl substituted and unsubstituted esters of these acids are included within the scope of this invention, for example, the methyl, ethyl, butyl, lauryl, cyclohexyl, 2- hydroxyethyl, 2-chloroethyl, allyl, phenyl, benzyl, trichlorobenzyl, polychlorophenyl, 1,2-ethylene (bis), glyceryl (mono-, bis-, or tris-), methoxyethyl furfuryl, or other esters, as well as thio-analogues of these. These esters are prepared by refluxing the free acids with the alcohols, or by first the acid with thionyl chloride to prepare the acid chloride, and then refluxing with the alcohol to convert the acid chloride to the ester. The thio esters can be prepared by reacting the acid chloride with a mercaptide, or by treating the ordinary ester with $P_2S_5$ in refluxing toluene.

Also, the amides of these said acids are included within the scope of this invention, for example, the simple amide and the N-substituted amides of the acids of the invention. Also, the N-methyl, N,N-dimethyl, N-phenyl, N-hydroxyethyl amides, and the like, as well as the thio-analogues of these. These amides can be prepared by treating the acid cloride with ammonia or an amine. In addition, the anhydrides, and the acid chlorides; the thio anhydrides will hydrolyze to the acids and may be used. The anhydrides or the thio anhydrides are made by adding one-half mole of water or $H_2S$, respectively, to the acid chloride in the presence of two moles of a base, such as pyridine.

While all of these derivatives have herbicidal utility, certain ones are preferred because of high activity and ease of formulation. These preferred derivatives are the free acids, the water-soluble salts, i.e., the alkali metal salts, ammonium, the mono-, di-, and tri-N-(lower alkyl)-substituted ammonium salts having from 1 to 6 carbon atoms peralkyl group, the mono-, di-, and triethanolammonium salts, the mono-, di-, and tripropanolammonium salts, the N-methylmorpholinium salt; and also the simple amides (unsubstituted on the — $NH_2$ group).

In addition the bromo analogues of the compounds of the invention are also embraced within the scope of this invention. Such compounds may include 5-methylamino-2,5-dibromobenzoic acid and salts thereof, 5-ethylamino-2-chloro-5-bromobenzoic acid and salts thereof.

The compounds of the invention may also be employed dissolved in organic solvents, such as xylene or supported on a solid carrier such as clay or vermiculite. The formulations may also include adjuvants such as wetting agents, sequestering agents, dispersing agents, and the like as is well established in the herbicide art. The formulation may also include other herbicides, to complement, supplement or synergise the action of the compound of the invention. For example, aminotriazole might be added to enhance the action on certain perennial weeds such as quackgrass. In choice of such a herbicidal additive, care must be taken to avoid obliterating the selectivity which is the outstanding feature of the compounds of the invention.

The selective action of the compounds of the invention is observed both in pre-emergence and in post-emergence applications on weedy crops such as soybeans, cotton, vegetables and in general broadleafed crops. The selectivity of these compounds is especially surprising in that the related compounds bearing only chlorine atoms on the ring and lacking the alkylamino group are notoriously non-selective. Many crops are sensitive to chlorophenoxy acetic acids and to other commonly known herbicides. This factor prevents or makes it very difficult to destroy or control the weeds commonly found in such crops. A few herbicides, such as chlorinated phenylureas, carbamates and nitrophenols are known which may be used pre-emergence in cotton and soybeans, but are poor or useless as selective herbicides when applied after the emergence of the crops and weeds and have other disadvantages such as high cost, severe variability in action as a result of weather conditions, and ineffectiveness on many important weeds. The compounds of this invention overcome these shortcomings. The compounds of the invention exhibit their selective action in the range of ½–20 pounds per acre, the preferred rates being about 1–8 pounds per acre. In this range, hitherto known chlorobenzoic compounds either fail to give weed control or cause destruction of the crop.

The following examples illustrating the method of preparation and utility of the composition of this invention are given for purposes of illustration not limitation.

EXAMPLE 1

*Preparation of 2,5-dichloro-3-benzylamino-benzoic acid*

The solution of 11.5 parts by weight of 2,5-dichloro-3-nitrobenzoic acid in 150 parts of methanol was stirred at 30 degrees centigrade under an atmosphere of hydrogen in the presence of 2 parts of commercial Raney nickel. One part of sodium acetate and 20 parts of benzaldehyde were then added and the reaction was resumed at the same temperature and pressure for twelve hours more. The solution was filtered and evaporated to precipitate a white solid which was filtered and recrystallized from methanol to yield 11 parts of product, melting point 165 degrees centigrade, neutralization equivalent 296 (theory 296).

*Analysis.*—Calculated for $C_{14}H_{11}Cl_2NO_2$: Cl, 24.0%; N, 4.74%. Found: Cl, 23.4%; N, 4.57%.

In a similar manner, starting with 2,5-dibromo-3-nitrobenzoic acid, 2,5-dibromo-3-benzylaminobenzoic acid is produced. In a similar manner, starting with 2-bromo-5-chloro-3-nitrobenzoic acid, 2-bromo-5-chloro-3-benzylaminobenzoic acid was produced.

EXAMPLE 2

Following the procedure of Example 1, using other carbonyl compounds in place of benzaldehyde, the compounds listed in the following table were made.

| Compound | Melting Point in Degrees Centigrade | Carbonyl Compound Employed | Neutralization Equivalent | | Percent Yield |
|---|---|---|---|---|---|
| | | | Calcd. | Found | |
| 2,5-dichloro-3-ethyl-aminobenzoic acid. | 186 | Acetaldehyde. | 234 | 233 | 80 |
| 2,5-dichloro-3-butyl-aminobenzoic acid. | 133 | n-Butyraldehyde. | 262 | 262 | 80 |
| 2,5-dichloro-3-methyl-amino-benzoic acid. | 145 | Formaldehyde. | 220 | 219 | 90 |
| 2,5-dichloro-3-methyl-amino-benzoic acid hydrochloride. | 198 | ___do___ | 128 | 127 | 90 |
| 2,5-dichloro-3-furfuryl amino-benzoic acid. | 160 | Furfuraldehyde. | 286 | 282 | 80 |

EXAMPLE 3

*Preparation of dimethylammonium salt*

To a stirred suspension of ten parts of 2,5-dichloro-3-methylaminobenzoic acid in 100 parts of water is added 30 percent aqueous dimethylamine until a pH of 8.5 is reached, to obtain a clear aqueous solution of dimethylammonium 3-methylamino-2,5-dichlorobenzoic acid.

In a similar manner, using triethanolamine as the base, the triethanolammonium salt is produced.

EXAMPLE 4

*Preparation of ammonium salt*

To a solution of one part of 2,5-dichloro-3-butylaminobenzoic acid in 100 parts of dry ether is added gaseous ammonia until no further precipitation occurs. The precipitated solids are removed by filtration and found to have the correct nitrogen analysis for the ammonium salt of 2,5-dichloro-3-butylaminobenzoic acid. The salt is a water-soluble colorless solid.

In a similar manner, using monomethylamine in place of ammonia, the monomethylammonium salt is made.

EXAMPLE 5

*Preparation of methyl 2,5-dichloro-3-butylaminobenzoate*

To a solution of one part of 2,5-dichloro-3-butylaminobenzoic acid in 50 parts of dry ether is added an ether solution of diazomethane until the yellow color of diazomethane persists. The solvent is then evaporated off under reduced pressure, leaving behind the methyl 2,5-dichloro-3-butylaminobenzoate as a light colored oil; showing the characteristic ester carbonyl band in the infrared spectrum.

EXAMPLE 6

*Preparation of N,N-dimethyl-2,5-dichloro-3-methylaminobenzamide*

The ester of Example 5 is stirred for 3 days at room temperature with an excess of aqueous 30 percent solution of dimethylamine. The reaction mixture is then evaporated under reduced pressure to remove the aqueous dimethylamine and the residual oil is found to have the correct nitrogen analysis for the dimethylamide of 2,5-dichloro-3-methylaminobenzoic acid.

In a similar manner, using aqueous ammonia, the simple amide of 2,5-dichloro-3-methylaminobenzoic acid is produced.

EXAMPLE 7

The post-emergence control of a representative compound in the present invention was demonstrated by its effect on various common weeds.

A test plot was seeded with dock, mustard, pigweed, lamb's-quarter, foxtail and crabgrass and planted with soybeans and snapbeans. About two weeks after emergence of weeds and crops, the same plot was sprayed with an aqueous solution of the sodium salt of 2,5-dichloro-3-methylaminobenzoic acid at the rate of 8 pounds of equivalent acid per acre. After several days there was substantially no damage to the crops therein but the weeds were almost totally destroyed.

Similar results are obtained by applying 8 pounds of the equivalent acid in the form of its methyl ester, its N,N-dimethylamide, or its amide, as the free acid itself.

EXAMPLE 8

A water solution of the sodium salt of 2,5-dichloro-3-ethylaminobenzoic acid was sprayed at the rate of 16 pounds per acre on a plot seeded the preceding day with soybeans, foxtail, quackgrass, crabgrass, Johnson grass, dock, mustard, pigweed, lamb's-quarter and chickweed. The soybeans emerged and grew normally, whereas the weeds were essentially completely prevented from emergence. The few weed seedlings which emerged did not continue to grow. A similar plot treated at 8 pounds per acre also showed excellent weed control.

Similar results were observed with the other compositions of the invention with variations in the relative pre-emergence and post-emergence activity, but all exhibiting a similar pattern of selectivity.

Although the above examples and description of this invention has been very specifically illustrated, many other modifications will naturally suggest themselves to those skilled in the art upon a reading of this disclosure. These are intended to be comprehended within the scope of this invention.

We claim:

1. A substance selected from the group consisting of the compound of the formula:

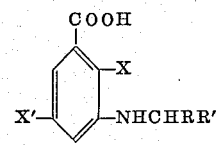

where X and X' are halogen radicals selected from the group consisting of chloro and bromo, R and R' are selected from the group consisting of hydrogen, lower alkyl, phenyl, and furyl, and the water-soluble salts thereof.

2. A compound of the formula:

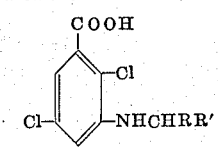

where R and R' are selected from the group consisting of hydrogen, lower alkyl, phenyl, and furyl.

3. The compound of claim 2 where R and R' are hydrogen.

4. The compound of claim 2 where R is hydrogen and R' is lower alkyl.

5. The compound of claim 2 where R is hydrogen and R' is the methyl radical.

6. The compound of claim 2 where R is hydrogen and R' is the ethyl radical.

7. The compound of claim 2 where R is hydrogen and R' is the propyl radical.

8. The compound 2,5-dichloro-3-benzylaminobenzoic acid.

9. The compound 2,5-dichloro-3-furfurylaminobenzoic acid.

10. A method for the selective control of weeds which comprises applying to the locus to be treated a phytotoxic amount of a composition containing as an active ingredient a substance selected from the group consisting of the compound of the formula:

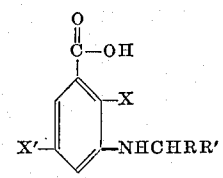

where X and X' are halogen radicals selected from the group consisting of chloro and bromo, R and R' are selected from the group consisting of hydrogen, lower alkyl, phenyl, and furyl, and the water-soluble salts thereof.

11. A method for the selective control of weeds which comprise aplying to the locus to be treated a phytotoxic amount of a composition containing as an active ingredient a compound of the formula:

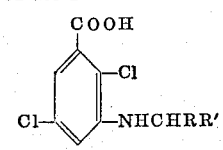

where R and R' are selected from the group consisting of hydrogen, lower alkyl, phenyl, and furyl, and water-soluble salts thereof.

References Cited by the Examiner

UNITED STATES PATENTS

| | | |
|---|---|---|
| 2,714,587 | 8/1955 | Neier. |
| 3,014,063 | 12/1961 | McLane et al. |
| 3,040,061 | 6/1962 | Bloom et al. 260—347.3 |
| 3,057,879 | 10/1962 | Corrodi et al. 260—347.3 |
| 3,092,483 | 6/1963 | Perkow 71—2.5 |
| 3,097,944 | 7/1963 | Riddell et al. 71—2.5 |

HENRY R. JILES, *Acting Primary Examiner.*

JOHN D. RANDOLPH, *Assistant Examiner.*